United States Patent [19]

Wheeler

[11] 4,102,118
[45] Jul. 25, 1978

[54] MULTI-PART WIRE ROPE FABRIC ASSEMBLY

[75] Inventor: Claud Ray Wheeler, Saint Joseph, Mo.

[73] Assignee: Wire Rope Corporation of America, Inc., Saint Joseph, Mo.

[21] Appl. No.: 778,072

[22] Filed: Mar. 16, 1977

[51] Int. Cl.² .................. F16G 11/02; D07B 1/00
[52] U.S. Cl. ........................... 57/144; 57/139; 57/142
[58] Field of Search .......... 57/139, 142, 144, 147, 57/145, 148; 24/129 W, 230.5 R, 114.5, 115 A, 122.6; 403/274, 275, 277, 284, 285; 198/823, 824, 827

[56] References Cited

U.S. PATENT DOCUMENTS

| | | | |
|---|---|---|---|
| 1,643,150 | 9/1927 | Conner | 57/142 X |
| 1,908,838 | 5/1933 | Green et al. | 403/284 |
| 2,000,997 | 5/1935 | Sharpe | 57/147 X |
| 2,008,227 | 7/1935 | Reilly | 403/284 |
| 2,162,130 | 6/1939 | Somerville | 57/145 |
| 2,799,133 | 7/1957 | Rose | 57/140 R |
| 2,988,394 | 6/1961 | Somerville | 57/142 X |
| 3,008,287 | 11/1961 | Crandall | 57/142 |
| 3,198,317 | 8/1965 | Robins | 198/824 X |
| 3,199,663 | 8/1965 | Baechli | 198/824 |
| 3,475,897 | 11/1969 | Leach | 57/142 X |
| 3,638,975 | 2/1972 | Buettner | 403/284 |
| 3,834,149 | 9/1974 | Nisbet | 57/145 |

*Primary Examiner*—Donald Watkins
*Attorney, Agent, or Firm*—Merriam, Marshall & Bicknell

[57] ABSTRACT

Wire rope assemblies, made from multi-part wire rope fabric, having one or more swaged fittings or terminals, to be used as pulling, lifting and support members.

5 Claims, 9 Drawing Figures

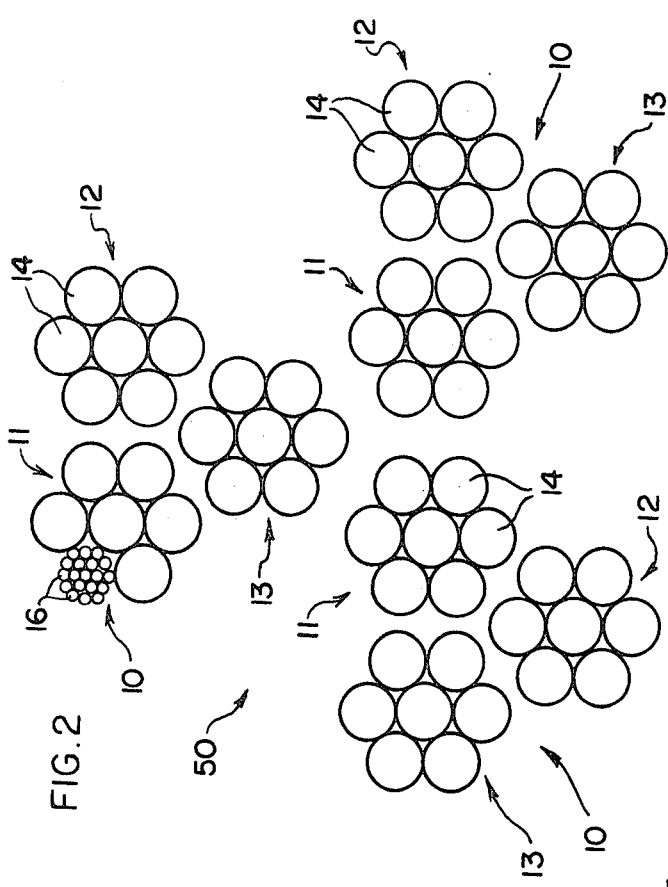
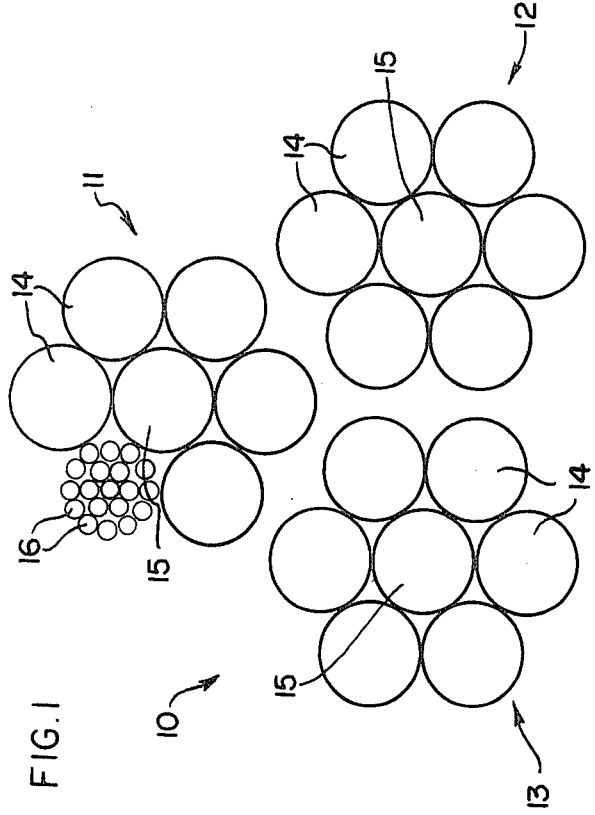
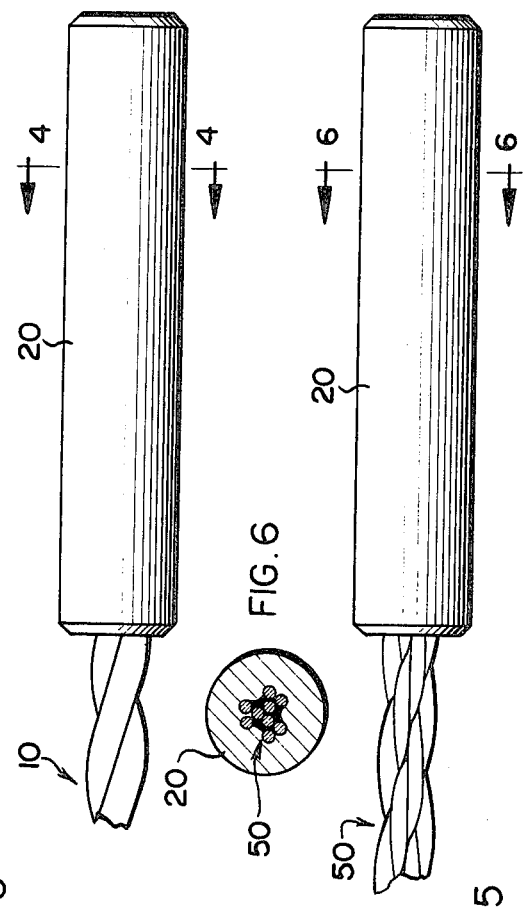
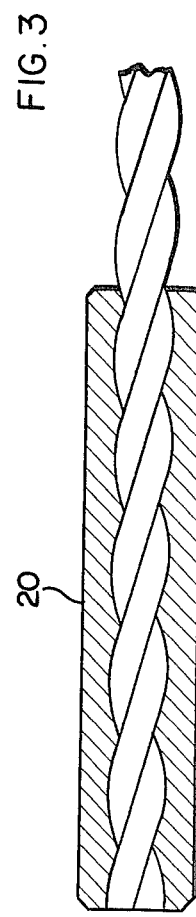
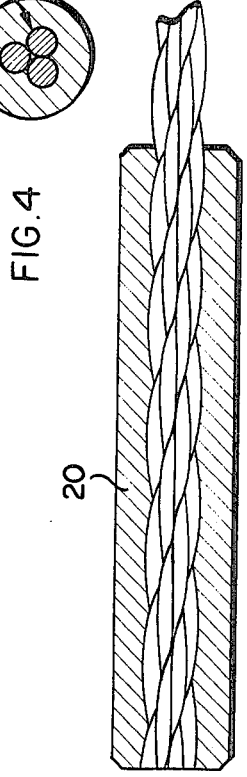

MULTI-PART WIRE ROPE FABRIC ASSEMBLY

This invention relates to wire rope assemblies having one or more swaged fittings or terminals and the use of such assemblies as pulling, lifting and support members.

A wire rope assembly generally comprises a length of wire rope onto which there is fastened one or more metal fittings or terminals such as a sleeve, hook, button, eye, fork, button ferrule or jaw. Such assemblies are widely used in industry where flexibility is important. The use of such assemblies is, however, sometimes limited by insufficient flexibility of the wire rope to meet some use requirements without putting undue strain on the wire rope, such as at sharp bends and nonaxial rotation, thereby limiting its useful life.

Although wire rope assemblies are widely used with the wire rope essentially exposed or uncovered, a particular assembly embodiment is used extensively as an integral part of a troughing idler roll for conveyor belts. The wire rope assembly used in a troughing idler roll comprises a length of wire rope having a substantially cylindrical metal fitting or terminal on each end of the wire rope. Each cylindrical terminal functions as an axle and is rotatably mounted in bearing means in a suitable support. A troughing roll comprises such a wire rope assembly and a body of flexible material mounted on and bonded to the wire rope for at least most of its length and generally extending partially onto each terminal. See U.S. Pat. Nos. 3,182,787 and 3,182,788.

The body of flexible material mounted on the wire rope in a troughing idler roll may have any suitable shape which will support a conveyor belt in a trough shape. This requires that the idler roll flex readily as it rotates. One form of flexible body comprises a series of spaced-apart rubber-like cylinders axially and integrally molded onto the wire rope and joined together integrally by axial sections of rubber-like material between the rubber-like cylinders. The axial sections are of less diameter than the rubber-like cylinders but the axial sections nearer the ends of the idler roll may be of larger diameter than those in the central part. A troughing idler roll of this type is commercially available under the trademark LIMBEROLLER from Joy Manufacturing Company, New Philadelphia, Ohio.

Another troughing idler roll embodiment uses a rubber-like upstanding flat topped helical rib integrally molded over a flexible core, and it may use a wire rope assembly as previously described.

Although troughing idler rolls of the described type are highly useful and are extensively employed in industry they do not have a useful life as long as is desired. Failure of such troughing idler rolls usually comes about through fatigue and breakage of the wire rope, not the rubber-like body. The continual flexing of the wires and strands in the wire rope with each revolution of the roller produces frictional action which ultimately leads to failure of the wire rope. An improved flexible support of the wire rope assembly type is accordingly needed, for use in a troughing idler roll, which develops less internal friction when it rotates in use.

According to one aspect of the present invention there is provided an assembly comprising a length of a multi-part wire rope fabric having at least one, and generally two or more, metal fittings swaged thereto. The multi-part fabric assembly is characterized by greater flexibility than a wire rope assembly of essentially equal strength. The greater flexibility of a multi-part wire rope fabric assembly when covered with a rubber-like material body can be used to form a troughing idler roll which develops less internal friction than a roller having a wire rope core. In a multi-part wire rope fabric, the strands of each individual rope share the torque and bending stresses when the assembly is rotated. A multi-part wire rope fabric assembly according to the invention, however, is not only useful in making troughing idler rolls but finds use as a substitute single part for wire rope in other applications, such as in driving trolley conveyors, where its flexibility gives an increased operating life and permits use on sharper curves than would otherwise be possible.

In order to clearly understand the invention it is important that the following definitions of terms used in the wire rope art be kept in mind. A strand comprises two or more wires helically layed around an axial center element. Two or more strands helically layed together with or without a core make a wire rope. Two or more wire ropes helically layed about an axis constitute a multi-part wire rope fabric. Included within the term multi-part wire rope fabric is a compound multi-part wire rope fabric formed by helically laying two or more multi-part wire rope fabrics about an axis.

Each of the one or more fittings is swaged to the multi-part wire rope fabric so tightly the fabric will break instead of the fitting slipping. The assemblies provided by the invention thus may be used under conditions which are calculated to rely on the full tensile strength of the wire ropes used in the fabrics rather than on the strength of the bond of the fitting to the fabric.

In its broadest aspect, the invention comprises a multi-part wire rope fabric having only one fitting swaged thereon. The fitting may be located at any predetermined location on, including the end of, a length of multi-part fabric. Similarly, two or more fittings may be located at spaced-apart locations on a length of multi-part wire rope fabric.

Any suitable fittings may be swaged onto the multi-part fabric, including those having hooks, eyes, threaded portions, flanges, holes or other geometric shapes suitable for an intended use. The fittings may also be so shaped as to function as spacers, stops or tripping fingers, such as for use on trolley conveyors.

The invention will be described further in conjunction with the attached drawings in which:

FIG. 1 is a cross-sectional view of a three-part multi-part wire rope fabric;

FIG. 2 is a cross-sectional view of a compound multi-part wire rope fabric of nine parts made such as by helically laying about an axis three three-part fabrics of the type shown in FIG. 1;

FIG. 3 illustrates a three-part multi-part wire rope fabric having a swaged terminal at each end;

FIG. 4 is a sectional view taken along the line 4—4 of FIG. 3;

FIG. 5 is a plan view partially in section of an assembly employing the nine-part fabric of FIG. 2 with a terminal swaged on each end;

FIG. 6 is a sectional view taken along the line 6—6 of FIG. 5;

So far as is practical the same numbers will be used to illustrate the same or similar parts or elements in the various views of the drawings.

Figure 7:
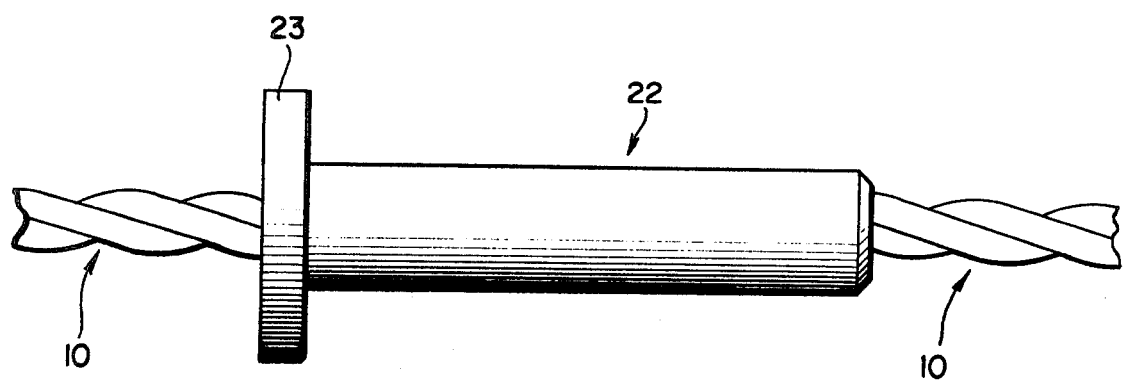
FIG. 7 is a partial plan view of a three-part fabric as shown in FIG. 1 with a trip type fitting swaged thereon along its length.

The three-part multi-part wire rope fabric 10 shown in FIG. 1 comprises three wire ropes 11, 12 and 13 helically layed around an axis. Each of the wire ropes is identical dimensionally and of the same precalculated strength. Each of the wire ropes 11, 12 and 13 comprises six wire strands 14 helically layed about an axial core 15. Each strand 14 is comprised of nineteen wires 16, with one wire constituting an axial core around which six wires are helically layed and over which layer the remaining twelve wires are helically layed in a layer. It should be understood, however, that the subject invention is not limited to the use of particular strands or to particular wire ropes. Other wire ropes using different arrangements of strands and wires may also be suitably employed in practicing the invention.

FIG. 2 shows in cross-section a compound multi-part wire rope fabric formed by helically laying about an axis three three-part multi-part wire rope fabrics such as those illustrated in FIG. 1.

FIGS. 3 and 4 show a three-part multi-part wire rope fabric as illustrated in FIG. 1 with identical fittings 20 swaged as terminals to each end thereof. Each of the fittings 20 is initially an elongated metal cylinder with an axial hole large enough for the three-part fabric 10 to be inserted therein prior to the swaging operation. The metal cylinders may be seamless or seamed. As a result of the swaging operation, the fitting 20 is reduced in diameter and becomes elongated. The swaging causes the metal in the fitting to flow into voids between wires and strands of the wire rope, thereby forming a very strong bond to the three-part wire rope fabric.

The assembly of FIGS. 3 and 4 is especially adapted for use in troughing idler rolls because of its unusually good flexibility. Troughing idler rolls produced by applying a flexible rubber-like body to such an assembly, after machining the fittings into axles for bearing means, are expected to have a useful life anywhere from 2 to 4 times or more than the useful life of a troughing idler roll produced using a single part wire rope instead of a multi-part wire rope fabric 10. It is understood that the fittings 20 will be machined into finished axles for supporting bearing means when employed in a troughing idler roll.

The embodiment of the invention shown in FIGS. 5 and 6 is similar to the embodiment shown in FIGS. 3 and 4. The only difference between the two embodiments is that in the embodiment of FIG. 5 a nine-part compound multi-part wire rope fabric 50 as illustrated in FIG. 2 is employed in place of a three-part wire rope fabric 10 used in the embodiment of FIG. 3. The embodiment of FIGS. 5 and 6 may be employed, such as when increased strength is desired, assuming that the size of the individual ropes are the same in each fabric. Also, by using smaller sized ropes a fabric according to FIG. 2 may be produced having a diameter and strength about equal to that obtained with the three-part fabric of FIG. 1 but with greater flexibility. The assembly of FIGS. 5 and 6 may also be covered with a rubber-like material to make a long-lived troughing idler roll, such as illustrated in U.S. Pat. Nos. 3,182,787 and 3,182,788 as well as the LIMBEROLLER.

FIG. 7 illustrates a three-part wire rope fabric 10 having a fitting 22 swaged thereon. The fitting 22 has a radial flange 23 at one end. Such an assembly may be used in a trolley conveyor in such a way that the flange 23 actuates a trip mechanism as the multi-part fabric is pulled along during operation of the conveyor. Any number of fittings 22 may be positioned on the fabric 10 as needed for suitable operation of the conveyor.

Figure 8:
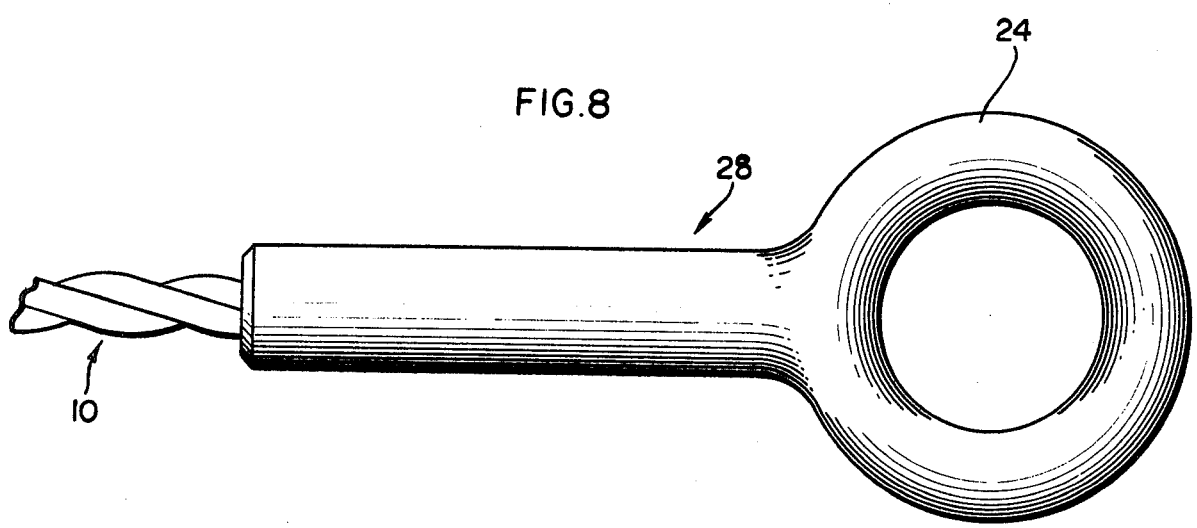
FIG. 8 is a partial plan view of a three-part fabric having an eye fitting swaged on to one end thereof.

FIG. 8 illustrates an eye fitting 28, having an eye 24 thereon, swaged onto the end of a section of three-part wire rope fabric 10.

Figure 9:
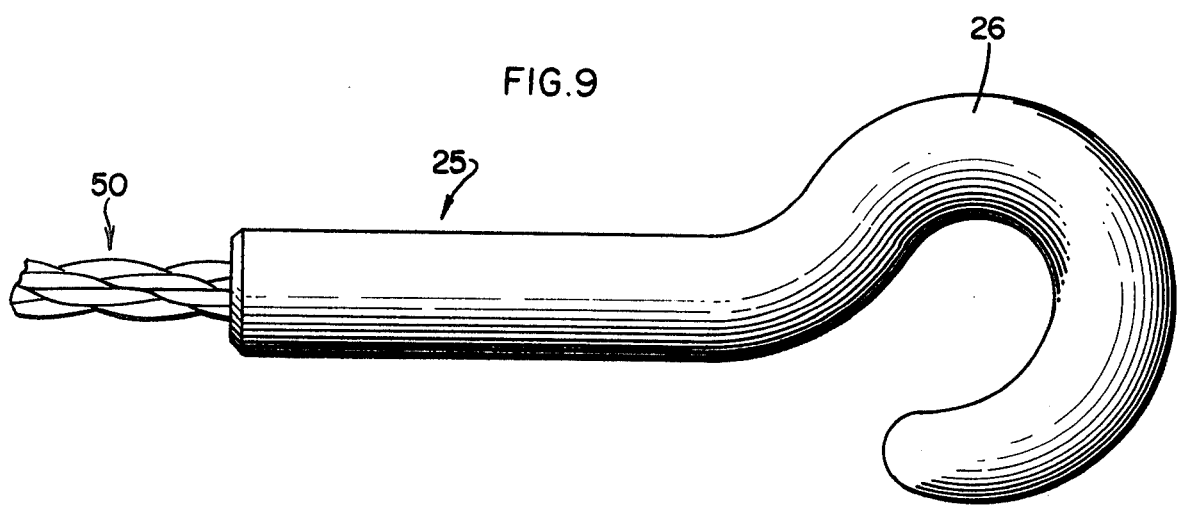
FIG. 9 is a partial plan view of a nine-part fabric having a hook swaged onto one end thereof.

FIG. 9 illustrates a fitting 25, having an integral hook 26, swaged onto the end of a nine-part wire rope fabric 50 of the type previously described.

Although the embodiments of the invention show assemblies using three and nine-part farics, it is within the scope of the invention to use two-part wire rope fabrics as well as fabrics having between three to nine wire ropes, as well as those having more than nine wire ropes.

One or more fittings, such as sleeves, hooks, buttons, eyes, forks or jaws may be swaged onto a length of multi-part wire rope fabric. Fittings as appropriate may be swaged onto the ends, or along the length, of a piece of wire rope fabric and by means of such fittings they may be coupled together into any suitable lengths.

It is an important feature of the invention that each fitting is swaged on to form a bond having a tensile strength equal to or greater than the multi-part fabric to which it is joined. This permits the assemblies of this invention to be made integral, rather than temporary, parts of installations.

The following example is presented to further illustrate the invention.

EXAMPLE

A multi-part wire rope fabric assembly as illustrated by FIGS. 1 and 3 for use in a troughing idler roll is manufactured using three component wire ropes, with each rope having a diameter of 3/16 inch. Each component rope is composed of seven strands of nineteen wires each. The nominal strength of the component rope is 4,200 pounds and the nominal strength of the multi-part fabric is 12,000 pounds. The nominal diameter of the multi-part fabric is ⅜ inch and the length is 32 inches. Each terminal fitting before swaging is a metal cyinder 0.875 inch in diameter, 3.530 inches long and has a bore of 0.437 inch. After swaging the terminal fitting is 0.770 inch in diameter and has a length of 4.062 inches.

The foregoing detailed description has been given for clearness of understanding only, and no unnecessary limitations should be understood therefrom, as modifications will be obvious to those skilled in the art.

What is claimed is:

1. An assembly comprising:
  a length of multi-part wire rope fabric containing three to nine helically layed wire ropes;
  a metal terminal fitting swaged onto each end of the length of multi-part fabric with a holding strength equal to or greater than the strength of the multi-part fabric; and
  said metal terminals constituting axles for supporting and rotating the assembly, and each terminal is a metal cylindrical sleeve in which the fabric is axially centered.

2. An assembly comprising:
  a length of multi-part wire rope fabric containing at least two wire ropes;
  a metal terminal fitting swaged onto each end of the length of multi-rope fabric; and each swaged metal terminal fitting having a holding strength equal to or greater than the strength of the multi-part fabric.

3. An assembly comprising:
a length of compound multi-part wire rope fabric comprising two or more multi-part wire rope fabrics each containing at least two wire ropes;
a metal terminal fitting swaged onto each end of the length of compound multi-part fabric; and
each swaged metal terminal fitting having a holding strength equal to or greater than the strength of the compound multi-part fabric.

4. An assembly comprising:
a length of multi-part wire rope fabric containing at least two wire ropes;
a metal fitting swaged onto the length of multi-part fabric; and
the swaged metal fitting having a holding strength equal to or greater than the strength of the multi-part fabric.

5. An assembly comprising:
a length of compound multi-part wire rope fabric comprising two or more multi-part wire rope fabrics;
a metal fitting swaged onto the length of compound multi-part wire rope fabric; and
the swaged metal fitting having a holding strength equal to or greater than the strength of the compound multi-part fabric.

* * * * *